(12) United States Patent
Kernik et al.

(10) Patent No.: US 6,302,244 B1
(45) Date of Patent: Oct. 16, 2001

(54) BRAKE SQUEAL ATTENUATOR APPARATUS AND METHOD

(75) Inventors: Alan C. Kernik; Neal F. Gilleran, both of Long Beach; Wilfred E. Boehringer, Fullerton, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/545,224

(22) Filed: Apr. 7, 2000

(51) Int. Cl.[7] .................................................. F16D 65/38
(52) U.S. Cl. .................. 188/73.36; 188/71.5; 188/73.37; 303/191
(58) Field of Search .............................. 188/71.5, 73.36, 188/73.37, 73.35; 303/191; 191/30 V

(56) References Cited

U.S. PATENT DOCUMENTS

| | | | |
|---|---|---|---|
| 3,419,114 | * 12/1968 | Rumsey | 188/73.36 |
| 4,556,260 | 12/1985 | Maehara . | |
| 4,588,205 | 5/1986 | Gaiser . | |
| 4,712,780 | 12/1987 | Ficht et al. . | |
| 4,887,872 | 12/1989 | Adams et al. . | |
| 4,919,495 | 4/1990 | Kircher et al. . | |
| 5,014,827 | 5/1991 | Wang et al. . | |
| 5,108,159 | * 4/1992 | Tsang et al. | 303/191 |
| 5,683,150 | 11/1997 | Burgdorf et al. . | |
| 5,686,150 | * 11/1997 | Burgdorf et al. | 303/116.1 |
| 5,746,292 | * 5/1998 | Tanaka et al. | 188/73.37 |
| 5,819,882 | * 10/1998 | Reynolds et al. | 188/71.5 |
| 5,911,484 | 6/1999 | Hashida . | |
| 6,003,641 | * 12/1999 | Boehringer et al. | 188/71.5 |
| 6,119,817 | * 9/2000 | Niespodziany et al. | 188/71.5 |
| 6,125,974 | * 10/2000 | Nishizawa et al. | 188/73.35 |
| 6,206,146 | * 3/2001 | Murai et al. | 188/73.36 |

* cited by examiner

Primary Examiner—Robert J. Oberleitner
Assistant Examiner—Devon Kramer
(74) Attorney, Agent, or Firm—Harness Dickey & Pierce P.L.C.

(57) ABSTRACT

A brake squeal attenuator for use with aircraft wheel brake assemblies. The attenuator includes a housing having a piston member and a weight disposed therein. The piston member and weight are biased by a spring disposed within the housing. The housing includes a neck portion which is in fluid communication with the hydraulic actuators of the brake assembly with which the attenuator is being used. The piston thus is biased on one side thereof by the biasing member and on an opposite side thereof by the hydraulic fluid pressure acting thereon. During braking, when torsional oscillations occur in the brake assembly which would otherwise cause objectionable brake squeal to occur, the entire housing of the attenuator, which is fixed to the housing of the wheel brake assembly, moves in accordance with the torsional oscillations which occur. The weight associated with the piston member causes movement of the piston member to lag behind movement of the attenuator housing as the attenuator begins oscillating. The attenuator thus produces a pumping of hydraulic fluid to and from the hydraulic actuators of the brake assembly which are timed to damp the torsional oscillating movement of the wheel assembly. The attenuator can be easily retrofitted to virtually all aircraft wheel brake systems without significantly adding to the cost or complexity of such systems.

20 Claims, 5 Drawing Sheets

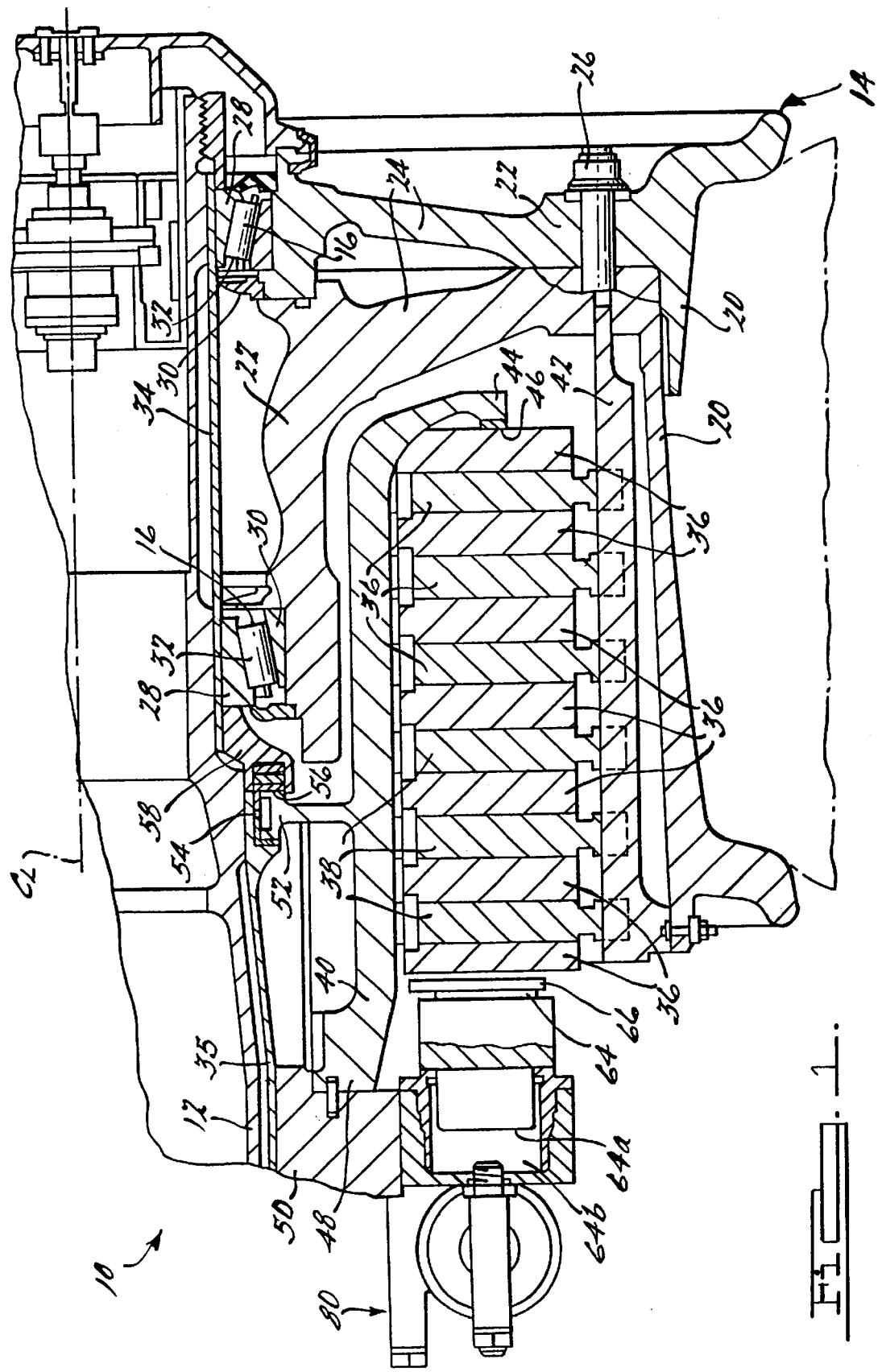

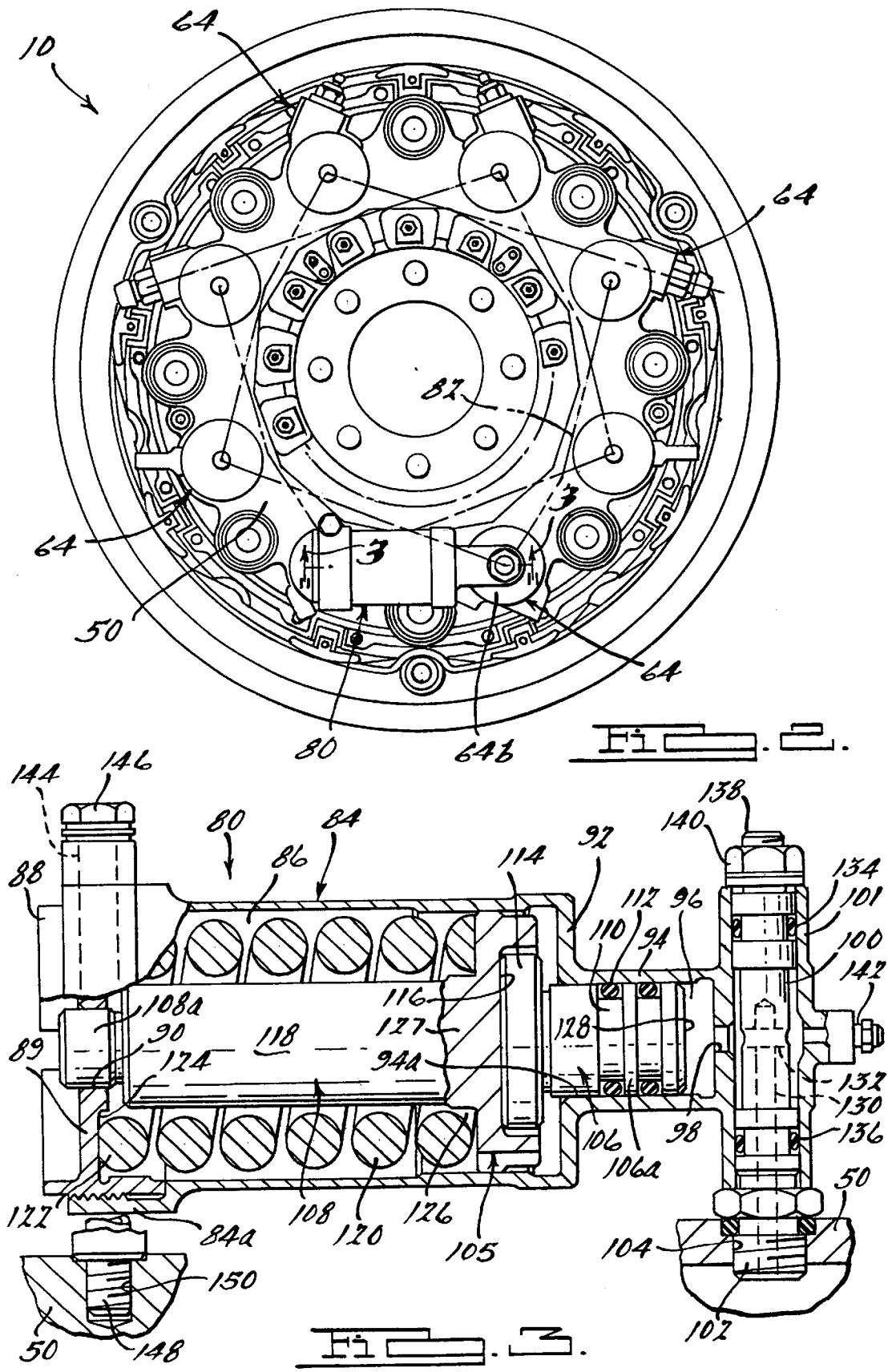

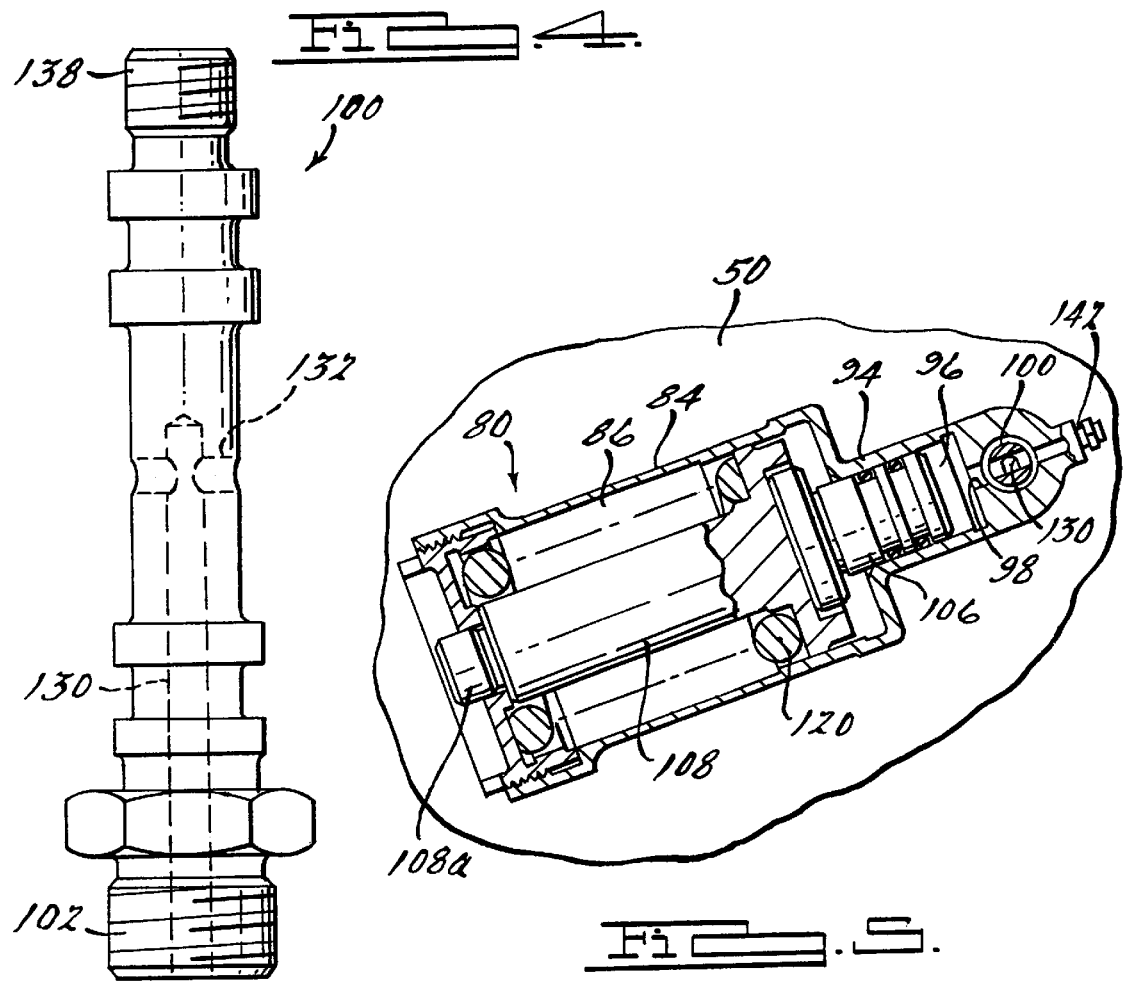
FIG. 4.
FIG. 5.
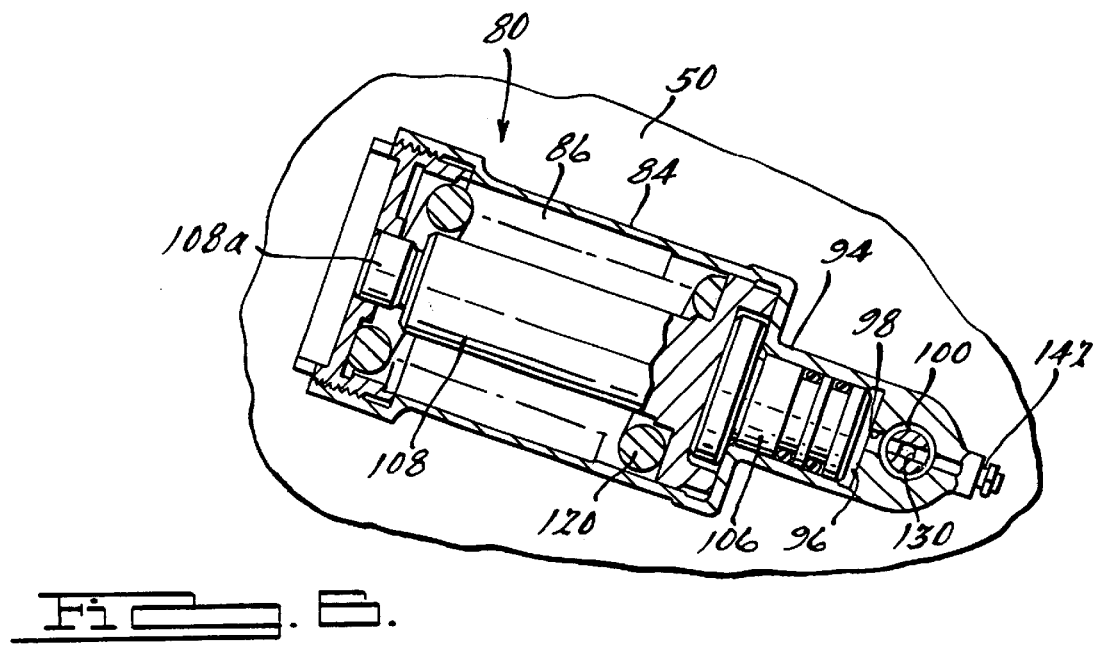
FIG. 6.

BRAKE SQUEAL ATTENUATOR APPARATUS AND METHOD

TECHNICAL FIELD

This invention relates to brake systems for aircraft, and more particularly to a brake squeal attenuator particularly well adapted for use with aircraft wheel brake assemblies.

BACKGROUND OF THE INVENTION

Brake squeal from wheel brake systems can be a frequent and annoying problem. These brake squeal problems can also occasionally cause costly accelerated wear and tear on a brake system and can affect both carbon and steel brakes.

Brake squeal is essentially a self-excited vibration in which the stationary parts of the brake oscillate torsionally about the wheel axle centerline. It can be experienced with aircraft brake systems as well as automotive braking systems. Brake squeal is closely tied to the friction properties of the brake lining material and, in particular, the relationship between friction coefficient and slip velocity. When the friction coefficient decreases with slip velocity, the friction forces become timed with the oscillating motion of the vibration, pushing the brakes further (i.e., torsionally about the axle) with each cycle. This can produce an unstable "squeal" vibration that grows in amplitude. Brake squeal is objectionable not only because of the loud, unpleasant noise generated, but also because of the accelerated wear that can be produced on the brake system if the degree of brake squeal produced is significant.

Brake squeal mitigation efforts have traditionally focused on changing the friction properties of the brake lining material used in the brakes. However, these efforts have tended to be trial and error efforts, and frequently have involved a tradeoff between limiting vibration levels and reducing brake wear properties. Other methods of attempting to reduce brake squeal include structurally stiffening the brakes, increasing friction damping and changing brake mass properties. The effects of these changes have proven to be of generally limited effectiveness, and a fine balance is required to achieve a stable brake which exhibits little or no brake squeal.

It is therefore a principal object of the present invention to provide a brake squeal attenuator that is capable of operating with existing aircraft wheel brake systems to eliminate, or substantially eliminate, brake squeal.

It is another object of the present invention to provide a brake squeal attenuator which can be easily retrofitted to existing aircraft wheel brake systems to entirely or substantially eliminate brake squeal.

It is still another object of the present invention to provide a brake squeal attenuator which can be added to an existing aircraft wheel brake system without significantly increasing the overall cost of the brake system and without requiring significant modifications to existing components of the brake system.

SUMMARY OF THE INVENTION

The above and other objects are provided by a brake squeal attenuator apparatus and method in accordance with preferred forms of the present invention. In one preferred embodiment, the brake squeal attenuator includes a housing having an internal cavity forming a cylinder in communication with a fluid flow port. The fluid flow port is coupled to the existing wheel brake system of an aircraft so as to communicate hydraulic brake fluid to and from the hydraulic actuators of the wheel brake system. A weighted piston assembly is disposed within the cylinder formed in the housing. A biasing member is disposed between one internal wall portion of the housing and one surface of the piston assembly. The other surface of the piston assembly extends into the flow port. A seal is provided between the flow port and the piston assembly so that brake fluid cannot flow around the piston. The weighted piston assembly is balanced between the pressure provided by the brake fluid on one side and the biasing force of the biasing member on the other side of the piston assembly.

When brake squeal begins to occur during application of the wheel brake system, the torsional oscillations that are produced about the axle centerline of the brake system cause the entire housing of the attenuator secured thereto to move in accordance with these oscillations. The inertia of the weighted piston assembly effectively causes it to "stroke" within the cylinder of the housing at a frequency in accordance with but opposite to (i.e., 180' out of phase with) the frequency of the brake squeal velocity oscillations. This stroking motion enables the attenuator piston assembly to pump hydraulic fluid into and out of the brake piston cavities of the wheel brake system, thus causing a damping oscillation in the brake fluid pressure and torque. The natural dynamic response of the attenuator apparatus thus produces brake torque oscillations that are timed to damp the oscillating motion of the wheel brake system. This effectively cancels the torsional oscillations of the wheel brake system that would otherwise give rise to the objectionable brake squeal.

The brake squeal attenuator and method of the present invention does not add significantly to the overall cost of the aircraft's wheel brake system. It further does not add significantly to the complexity of the wheel brake system, does not require significant periodic maintenance, and can be retrofitted to existing wheel brake systems with a minimal amount of effort and expense.

BRIEF DESCRIPTION OF THE DRAWINGS

The various advantages of the present invention will become apparent to one skilled in the art by reading the following specification and subjoined claims and by referencing the following drawings in which:

FIG. 1 is a partial cross sectional side view of an aircraft wheel brake system illustrating the brake squeal attenuator of the present invention coupled thereto;

FIG. 2 is a front elevational view of the brake squeal attenuator and wheel brake system shown in FIG. 1;

FIG. 3 is a cross sectional side view of the attenuator taken in accordance with section line 3—3 in FIG. 2;

FIG. 4 is an elevational view of a mounting member of the attenuator used to interface the attenuator with an hydraulic actuator of the aircraft wheel brake system;

FIG. 5 is a simplified schematic view of the attenuator after same has been rotated counterclockwise to a maximum extent during torsional oscillation of the wheel brake system of FIG. 2;

FIG. 6 is a simplified schematic view of the attenuator after same has been rotated clockwise to one extreme during torsional oscillation of the wheel brake system of FIG. 2;

DETAILED DESCRIPTION OF THE PREFERRED EMBODIMENTS

Figure 7:
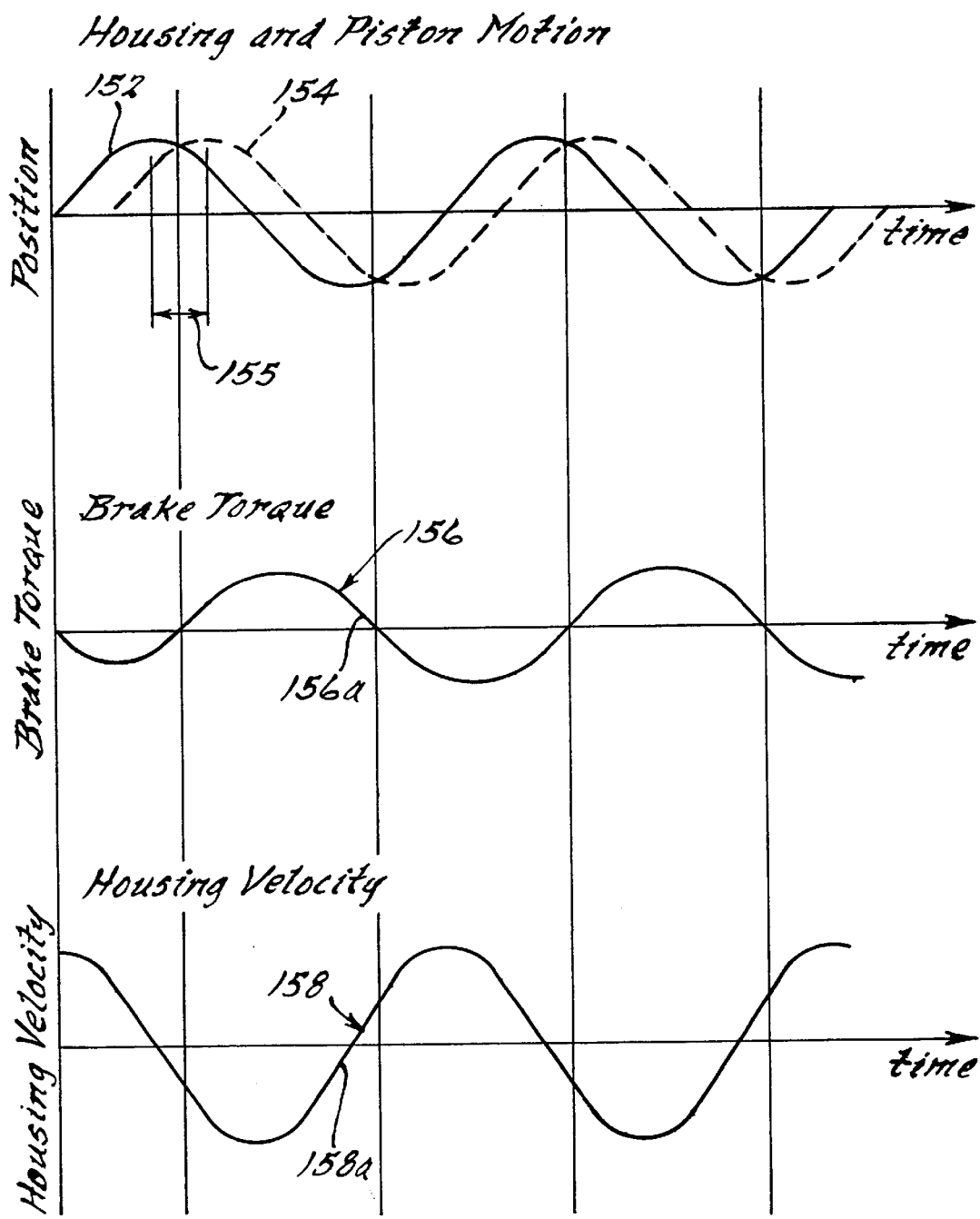
FIG. 7 illustrates a plurality of waveforms representing attenuator housing position, brake torque generated in a wheel brake system incorporating the brake attenuator of the present invention, and housing velocity.

Referring to FIG. 1, there is shown a typical wheel brake system 10 incorporating a brake squeal attenuator 80 in accordance with a preferred embodiment of the present invention. The wheel and brake assembly 10 shown is for use with an aircraft, but it is understood that the attenuator 80 could be used with virtually any other form of brake system, such as, for example, an automotive wheel brake system.

The wheel brake system 10 is mounted on a central axle 12 of a landing gear of an aircraft. A wheel, generally indicated at 14, is rotatably mounted on the axle 12 by bearings 16 for rotation about a central longitudinal axis "$C_L$" of the axle. The wheel 14 includes two annular members each having a rim portion 20 for supporting a tire thereon and a hub portion 22 interconnected with the rim portion 20 by a web 24. The wheel members are fastened together by suitable fastening devices such as bolts 26. The hub portions 22 are supported for rotation on two tapered roller bearings 16 which include an inner race 28 mounted in rotationally fixed relation to the axle 12, an outer race 30 fixed to the hub portion 22, and tapered rollers 32 secured between the inner and outer races. The inner race 28 of each bearing 16 is preferably mounted on an axle sleeve 34 which extends over the axle 12 in a rotationally fixed position. It is to be understood that the number and type of bearings 16 and configuration of the wheel 14, axle 12 and axle sleeve 34, and that the foregoing description, as well as the subsequent description of the brake structure of the wheel brake system 10, may be different than shown without departing from the scope of the present invention.

The brakes shown are conventional multi-disk brakes comprising friction disks of carbon composite material or steel disks having wear resistant friction material on the outer surfaces, for example. As shown in FIG. 1, the brake system 10 comprises seven stator disks 36 and six rotor disks 38. The rotor disks 38 are axially slidably mounted on the wheel 14 and the stator disks 36 are axially slidably mounted on a torque tube 40 and interposed between the rotor disks. The rotor disks 38 are preferably attached by keys 42 (only one is shown) to the wheel 14 at circumferentially spaced locations around the wheel. The keys 42 support the rotor disks 38, which have internally slotted grooves for captive engagement by the key 42. The stator disks 36 are commonly attached to the torque tube 40 by a splined connection (not shown).

The torque tube 40 locates and supports the stator disks 36 relative to the brake and removes braking torque during braking operations. An outwardly flaring end 44 of the torque tube 40 includes a reaction plate 46 for engagement with the axially outermost stator member 36 (right end of brake stack as viewed in FIG. 1). Another end 48 of the torque tube 40 is connected with a brake housing 50. The torque tube 40 is located in a fixed position about the axle 12 and includes a torque tube foot 52 extending circumferentially around the axle 12 and radially inward from the torque tube 40 to the axle 12 for support by the outer diameter of the axle 12. The free end of the torque tube foot 52 is generally U-shaped when viewed in transverse cross section. A pair of bushings 54 are interposed between the torque tube foot 52 and the axle 12 at positions such that the foot 52 is received within the two bushings with sides 56 of the foot in contact with the bushings. The bushings 54 rest on a second axle sleeve 35 and a spacer 58 located between the torque tube foot 52 and the bearing 16.

Referring further to FIG. 1, the brake housing 50 includes a brake actuating mechanism comprising a plurality of circumferentially spaced hydraulic actuators 64. The hydraulic actuators have pistons 64a for selectively compressing the stator disks 36 and rotor disks 38 axially into frictional engagement with each other by applying a brake-actuating thrust to the axially innermost stator disk (i.e., the left end of the brake stack as viewed in FIG. 1) through pressure plates 66 connected to the pistons 64a. The hydraulic actuators 64 are further illustrated in FIG. 2.

During braking operations, braking torque is transferred from the stator disks 36 to the torque tube 40 through the reaction plate 46 at one end 44 of the torque tube 40, from the rotor disks 38 to the splined connection of the torque tube 40, and transmitted to the torque tube 40 by the brake housing 50 connected to the opposite end 48 of the torque tube 40.

It will be appreciated that the foregoing description of the wheel brake assembly has been provided as merely one example of a brake system with which the brake squeal attenuator 80 of the present invention may be used. Further details of the operation of one specific form of wheel brake assembly may be found in U.S. Pat. No. 6,003,641, assigned to the assignee of the present invention, and which is hereby incorporated by reference into the present application. Accordingly, it will be appreciated that the brake squeal attenuator of the present invention is not limited to the specific wheel brake system shown in FIGS. 1 and 2, but rather is suited for use with other forms of aircraft and non-aircraft wheel brake systems. The brake squeal attenuator of the present invention is capable of being used with virtually any wheel brake system which suffers from brake squeal.

Referring further to FIG. 1, the attenuator 80 is fixedly secured to the brake housing 50 and in fluid communication with at least one of the cylinders 64b of one of the hydraulic actuators 64 of the wheel brake system 10. Since the attenuator 80 is fixedly secured to the brake housing 50, it moves therewith when the brake housing 50 experiences torsional oscillations about the axle centerline ($C_L$), which torsional oscillations could cause brake squeal to occur.

With specific reference to FIG. 2, the brake squeal attenuator 80 of the present invention is shown in fluid communication with four of the brake cylinders 64b associated with the hydraulic actuators 64. This is denoted by lines 82 coupling four of the hydraulic actuators 64 to the specific actuator 64 in direct fluid communication with the attenuator 80.

Referring to FIG. 3, the attenuator 80 can be seen in cross section. The attenuator 80 includes a housing 84 having an enlarged cavity 86. A first end 88 of the housing 84 includes an end cap 89 which is threadably engaged with a rear flange 84a of the housing 84. The end cap 89 also includes a port 90. A second end 92 of the housing 84 includes a neck portion 94 having a flow port 96 formed therein. The flow port 96 communicates via an aperture 98 with a mounting member 100. The mounting member 100 is disposed within a transversely extending neck 101 of the attenuator housing 84. The mounting member 100 is in fluid communication with the brake cylinder 64b and is also used to mount the attenuator 80 to the housing 50 of the wheel brake system 10 via a threaded end portion 102 which is engaged within a threaded opening 104 in the housing 50.

Referring further to FIG. 3, a piston assembly 105 comprising a piston member 106 and a weight 108 is disposed within the housing 84. The piston member 106 has a neck portion 106a having a plurality of grooves 110 which cooperate with seals 112 to prevent hydraulic fluid from flowing between an inner wall 94a of the neck portion 94 and the piston member 106. A head portion 114 of the piston member 106 seats within a recess 116 of the weight 108. The weight 108 further has a neck portion 118 around which is disposed a biasing member in the form of a coil spring 120. One end 122 of the coil spring 120 abuts against an inner surface 124 of the first end 88 of the housing 84 while a second end 126 of the coil spring 120 abuts against a head portion 127 of the weight 108. Thus, the weight 108 and piston member 106 are biased by the coil spring 120 to the right in the drawing of FIG. 3. Once installed, the weight 108 is balanced by the biasing force provided by the coil spring 120 and the pressure of the hydraulic fluid on surface 128 of the neck portion 106a of the piston member 106. The weight 108 may be formed from a variety of materials but in one preferred form is comprised of bronze, and has a weight in the range of about 45 ounces–55 ounces.

Referring to FIGS. 3 and 4, the mounting member 100 includes a first flow passage 130 extending longitudinally through a portion thereof, and intersecting a second flow passage 132 extending transversely to the first flow passage 130. Hydraulic fluid is thus free to flow through the flow passages 130 and 132 into and out of the attenuator 80. The mounting member 100 also includes a pair of O-ring seals 134, 136 to prevent leakage of the hydraulic fluid from the attenuator 80. A threaded end portion 138 receives a nut 140 which secures the attenuator 80 to the housing 50. A bleed port 142 allows air within the neck portion 94 and the transversely extending neck 101 to be bled from the attenuator 80.

With further brief reference to FIG. 3, the weight 108 includes a boss 108a sized so as to be able to extend into the port 90 in the housing 84. This helps to support the weight 108 coaxially within the cavity 86. The first end 88 of the housing 84 also includes a laterally offset bore 144 through which a mounting bolt 146 extends. The mounting bolt 146 includes a threaded lower end 148 which engages with a second threaded opening 150 in the brake housing 50. Thus, the attenuator 80 is supported fixedly on the brake housing 50 at both ends thereof.

Referring now to FIGS. 3, 5, and 6, the operation of the brake squeal attenuator 80 will be described. The attenuator 80 is shown in a "neutral" position in FIG. 3, which it assumes when no torsional oscillations are occurring in the wheel brake system 10. As torsional oscillations begin to develop during a braking cycle, the entire housing 84 of the attenuator 80 begins to oscillate with the brake housing 50.

Referring to FIG. 5, as the entire attenuator 80 moves counterclockwise during a first portion of the torsional oscillation, the mass of the weight 108 causes the movement of the weight 108 to tend to lag behind the movement of the housing 84 while the housing 84 moves counterclockwise. This allows an additional quantity of brake fluid to be drawn in through the aperture 98 as the weight 108 compresses the coil spring 120 slightly.

Referring to FIG. 6, when the torsional oscillation causes the entire brake housing 50 to move in the clockwise direction, the entire housing 84 of the attenuator 80 moves therewith. Then, the mass of the weight 108 causes the movement of the weight 108 to tend to lag behind the movement of the housing 84 as clockwise movement of the attenuator 80 occurs. This action effectively causes the piston 106 to be extended or to "stroke", thus forcing hydraulic fluid within the neck portion 94 out through the aperture 98 and the mounting member 100 into the hydraulic actuator 64. The action illustrated in FIGS. 5 and 6 occurs repeatedly in alternating fashion as the axle 12 oscillates torsionally during the braking cycle. The fluid pumping action produced by the attenuator 80 effectively pumps hydraulic brake fluid into and out of the brake cylinders 64b of the hydraulic actuators 64 thus causing oscillations in the brake pressure and torque applied by the wheel brake system 10. These oscillations in the brake pressure and torque generated by the attenuator 80 produce brake torque oscillations that are approximately 180° out of phase with the torsional oscillations, and are thus timed to damp the oscillating motion of the wheel brake system 10. This entirely, or substantially, eliminates the brake squeal that could otherwise occur because of the torsional oscillations in the wheel brake system 10.

This damping action is illustrated in FIG. 7. In FIG. 7, waveform 152 represents the position of the housing 84 while waveform 154 represents the position of the piston 106. Waveform 156 represents the degree of brake torque provided by the brake system 10 as hydraulic fluid is pumped to and from the brake system 10 by the attenuator 80. Waveform 158 represents the velocity of the housing 84 of the attenuator 80.

From waveforms 152 and 154, it can be seen that the position of the piston 106 lags behind the position of the housing 84 during oscillating movement of the housing 84. This position lag is represented by arrow 155. When waveform 152 is greater than waveform 154, hydraulic fluid is pumped out of the brake system 10. When waveform 152 is less than waveform 154, the fluid is pumped into the brake system 10.

From waveform 156, it can be seen that brake torque increases whenever fluid is being pumped into the brake system 10. The frequency of the changing magnitude of the brake torque is generally in accordance with the frequency of oscillation of the housing 84. The brake torque decreases whenever hydraulic fluid is pumped out of the brake assembly 10.

From waveform 158, it will be noted that the velocity of the housing 84 is approximately 90° out of phase with the position of the housing 84. The brake torque developed therefore acts to oppose the direction and magnitude of the housing velocity, as indicated by the portion 156a of waveform 156 and portion 158a of waveform 158, which are 180° out of phase with one another. In this manner the brake torque generated by the attenuator 10 acts to "track" the velocity of the housing 84 during brake squeal oscillations to cancel the oscillating motion of the brake system 10.

Figure 8:
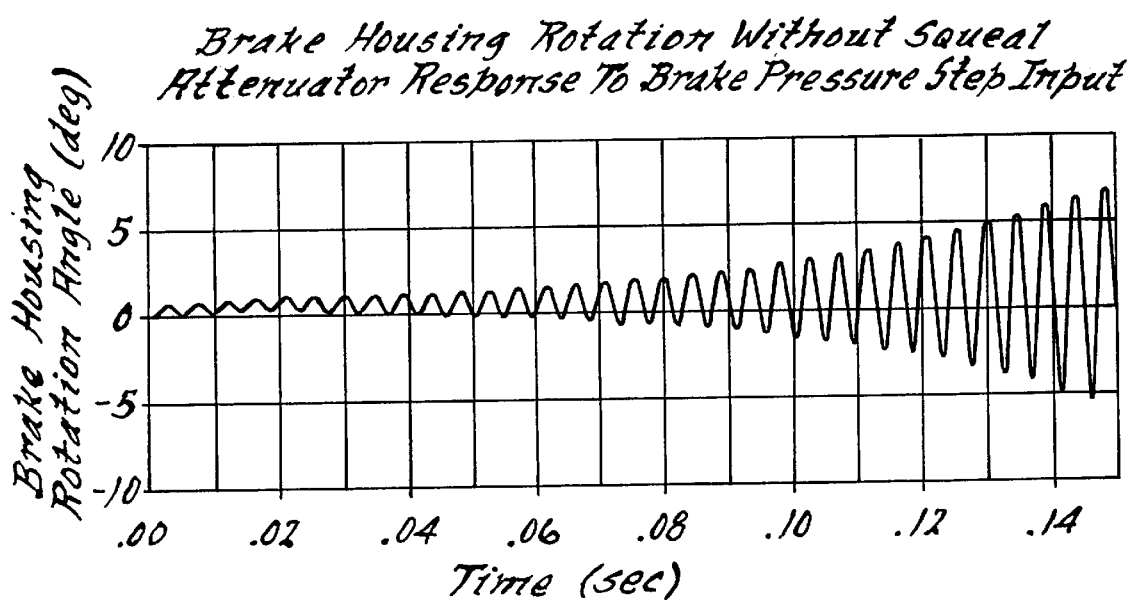
FIG. 8 is a graph illustrating the exponentially increasing magnitude of the torsional oscillations created during a braking action without the brake squeal attenuator of the present invention.
Figure 9:
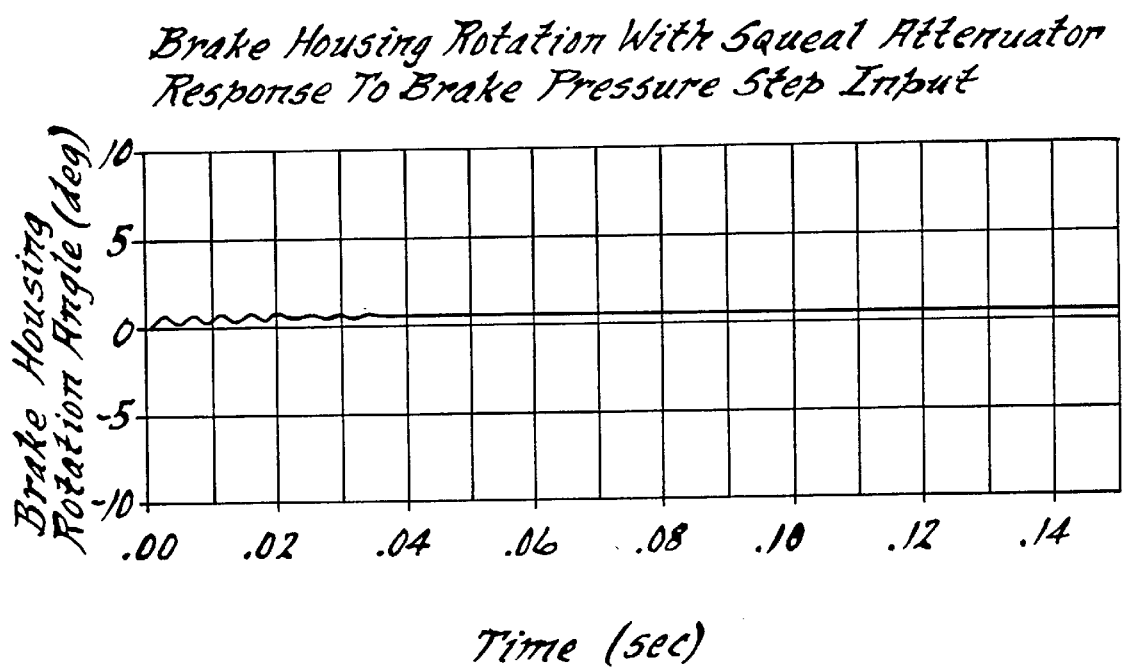
FIG. 9 is a graph of the torsional oscillations of a brake system incorporating the attenuator of the present invention.

Referring to FIG. 8, a graph illustrates the exponentially increasing magnitude of the brake squeal produced in response to a brake pressure step input signal when the attenuator 80 of the present invention is not employed. FIG. 9 illustrates the magnitude of the brake squeal oscillations when the attenuator 80 of the present invention is used.

The brake squeal attenuator 80 of the present invention thus provides a relatively simple yet highly effective means for completely or substantially damping the torsional oscillations that result during braking in many aircraft wheel assemblies. The attenuator of the present invention can be easily retrofitted to virtually all existing wheel and brake assemblies used with aircraft. The attenuator can further be adapted with little or no modification for use with a wide variety of other braking systems employed on other forms of vehicles.

The attenuator of the present invention is relatively structurally simple, does not add significantly to the overall cost of an aircraft wheel and brake assembly, requires virtually no maintenance, and effectively functions to dampen the highly objectional brake squeal that often occurs during braking with various forms of wheel and brake assemblies.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A brake squeal attenuator apparatus for attenuating brake squeal in a brake assembly caused by torsional oscillation of a housing of the brake assembly during operation of the brake assembly, said apparatus comprising:

an attenuator housing in fluid communication with said brake assembly and fixedly secured to said brake assembly so as to move therewith;

a piston disposed within said attenuator housing, said piston having a weight sufficient to cause movement of said piston to tend to lag behind movement of said attenuator housing as said attenuator moves in an oscillating fashion with said brake assembly during a braking cycle; and wherein movement of said attenuator housing relative to said piston enables said attenuator apparatus to produce an oscillating pumping action of brake fluid to said brake assembly, said oscillating pumping action being operable to damp said torsional oscillation and thereby inhibit brake squeal from developing during said braking cycle.

2. The apparatus of claim 1, further comprising a biasing member disposed within said attenuator housing for providing a constant biasing force on said piston.

3. The apparatus of claim 1, wherein said attenuator housing includes a transversely extending neck and a mounting member extending through said transversely extending neck for supporting said attenuator housing on said brake assembly and permitting fluid communication between said attenuator and said brake assembly.

4. The apparatus of claim 3, wherein said mounting member includes a longitudinally extending flow passage formed therein.

5. The apparatus of claim 1, wherein said attenuator housing includes a cavity and a neck portion having a seal disposed inbetween said neck portion and said piston, to thereby prevent the flow of said brake fluid past said piston into said cavity.

6. The apparatus of claim 1, further comprising a bleed valve for bleeding air from said attenuator apparatus.

7. The apparatus of claim 2, wherein said piston includes a piston member and weight, said weight being disposed between said piston member and said biasing member.

8. A brake squeal attenuator apparatus for attenuating brake squeal in a brake assembly caused by torsional oscillation of a brake housing of the brake assembly during operation of the brake assembly, said apparatus comprising:

an attenuator housing secured to said brake housing of said brake assembly, said attenuator housing having a first end and a second end, said second end being in fluid communication with an hydraulic actuator within said brake assembly;

a piston disposed within said attenuator housing between said first and second ends;

a biasing member disposed between said piston and said first end of said attenuator housing to provide a constant biasing force on said piston; and said piston having a mass sufficiently high so as to tend to resist oscillating movement when said attenuator housing moves in an oscillating fashion with said brake assembly during operation of said brake assembly, thereby causing said piston to produce an oscillating pumping action of hydraulic fluid into said brake assembly which is operable to damp said oscillating movement of said brake assembly, to thereby prevent said brake squeal.

9. The apparatus of claim 8, wherein said first end of said attenuator housing includes a cavity;

wherein said piston includes a neck portion and a head portion; and wherein said attenuator housing further includes a seal adapted to engage with said neck portion to prevent said hydraulic fluid from passing into said cavity during operation of said apparatus.

10. The apparatus of claim 8, wherein said biasing member comprises a spring.

11. The apparatus of claim 8, wherein said piston comprises a weight of between about 45 ounces–55 ounces.

12. The apparatus of claim 8, wherein said second end of said attenuator housing includes a bleed valve for bleeding air within said apparatus to atmosphere.

13. The apparatus of claim 8, wherein said piston comprises:

a piston member; and a weight disposed between said piston member and said biasing member.

14. The apparatus of claim 8, further comprising a mounting member for supporting said attenuator housing on said brake housing and for enabling fluid communication between said apparatus and said brake housing.

15. A brake squeal attenuator apparatus for attenuating brake squeal in an aircraft brake assembly caused by torsional oscillation of a brake housing of the brake assembly during operation of the brake assembly, said apparatus comprising:

an attenuator housing secured to said brake housing of said brake assembly so as to move with said brake housing of said brake assembly, said attenuator housing having a neck portion and a cavity, said neck portion being in fluid communication with an hydraulic actuator of said brake assembly;

a piston disposed within said cavity of said attenuator housing and projecting partially into said neck portion;

a biasing member disposed in said cavity of said attenuator housing for providing a constant biasing force on said piston;

a mounting member for supporting said attenuator housing on said brake housing and for communicating hydraulic fluid between said hydraulic actuator and said attenuator housing; and said piston having a mass sufficiently high so as to tend to resist oscillating movement when said attenuator housing moves in an oscillating fashion with said brake assembly during operation of said brake assembly, thereby causing said piston to produce an oscillating pumping action of said hydraulic fluid between said attenuator housing and said hydraulic actuator so as to damp said oscillating movement of said brake assembly, to thereby prevent said brake squeal from developing.

16. The apparatus of claim 15, further comprising a seal disposed in said neck portion for preventing flow of said hydraulic fluid past said piston disposed within said attenuator housing and into said cavity of said attenuator housing.

17. The apparatus of claim 15, wherein said piston comprises a weight of between about 45 ounces–55 ounces.

18. The apparatus of claim 15, wherein said neck portion of said attenuator housing includes a bleed valve.

19. The apparatus of claim 15, wherein said biasing member comprises a coil spring interposed between an internal wall of said cavity of said attenuator housing and said piston.

20. A method for attenuating torsional oscillation of a brake housing of a wheel brake system during a braking cycle, said method comprising the steps of:

securing an attenuator housing in fluid communication with at least one hydraulic actuator of said wheel brake system, and fixedly to a portion of said wheel brake system so as to move therewith during oscillating movement of said wheel brake system;

disposing a piston within said attenuator housing, the piston having a mass sufficiently high to tend to cause movement of the piston to lag behind movement of the attenuator housing when said attenuator housing oscillates in accordance with said portion of said wheel brake system; and using said piston and said attenuator housing to generate a pumping action of hydraulic fluid to said hydraulic actuator which operates to damp said oscillating movement of said wheel brake system.

* * * * *